(12) United States Patent
Prezecki, II

(10) Patent No.: US 10,377,284 B2
(45) Date of Patent: Aug. 13, 2019

(54) HOLDER ASSEMBLY

(71) Applicant: Ford Global Technologies, LLC, Dearborn, MI (US)

(72) Inventor: Leonard Gus Prezecki, II, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 298 days.

(21) Appl. No.: 15/437,034

(22) Filed: Feb. 20, 2017

(65) Prior Publication Data

US 2018/0236910 A1 Aug. 23, 2018

(51) Int. Cl.
| | |
|---|---|
| *B60N 2/75* | (2018.01) |
| *B60N 3/10* | (2006.01) |
| *B60R 11/00* | (2006.01) |
| *B60R 7/04* | (2006.01) |

(52) U.S. Cl.
CPC ............... *B60N 2/793* (2018.02); *B60N 3/10* (2013.01); *B60N 3/103* (2013.01); *B60R 7/043* (2013.01); *B60R 2011/0061* (2013.01); *B60R 2011/0082* (2013.01); *B60R 2011/0084* (2013.01); *B60R 2011/0089* (2013.01)

(58) Field of Classification Search
CPC .......... A47C 7/622; A47C 7/624; B60N 3/004
USPC ................. 297/188, 188.05, 188.01, 188.06
See application file for complete search history.

(56) References Cited

U.S. PATENT DOCUMENTS

| | | | |
|---|---|---|---|
| 1,688,765 A | 11/1926 | Veras | |
| 4,877,164 A * | 10/1989 | Baucom | B60N 3/101 224/544 |
| 5,295,650 A | 3/1994 | Brandt | |
| 5,413,400 A * | 5/1995 | Llanes | A47C 4/10 297/154 |
| 5,489,055 A | 2/1996 | Levy | |
| 5,746,363 A | 5/1998 | Teller et al. | |
| 5,865,124 A * | 2/1999 | Wroe | A47C 7/70 108/157.11 |
| 5,904,405 A * | 5/1999 | Wu | B60N 2/885 297/391 |
| 6,092,868 A * | 7/2000 | Wynn | A47C 7/72 297/188.05 |
| 6,345,861 B1 * | 2/2002 | Goodo | A47C 4/10 297/171 |
| 6,520,576 B1 | 2/2003 | Burns et al. | |
| 6,715,726 B1 | 4/2004 | Dybalski | |
| 7,040,699 B2 * | 5/2006 | Curran | B60K 35/00 248/919 |
| 7,703,854 B2 * | 4/2010 | LaFreniere | A47C 7/546 297/31 |
| 7,963,592 B1 * | 6/2011 | Stanley | A47C 20/026 297/188.04 |
| 9,578,972 B2 * | 2/2017 | Purintun | A47C 7/72 |
| 10,053,049 B1 * | 8/2018 | Carter | A47C 7/38 |

(Continued)

*Primary Examiner* — Jose V Chen
(74) *Attorney, Agent, or Firm* — Vichit Chea; Price Heneveld LLP

(57) ABSTRACT

A holder assembly includes a connector positioned at a first end of the holder assembly. An accessory-engagement portion is positioned at a second end of the holder assembly. The accessory-engagement portion is configured to removably couple with an accessory. An arm is positioned between the first end and the second end. An attachment elbow is positioned between the arm and the connector. The attachment elbow is pivotable about a hinge.

20 Claims, 8 Drawing Sheets

(56) References Cited

U.S. PATENT DOCUMENTS

| | | | |
|---|---|---|---|
| 2008/0164714 A1* | 7/2008 | Lee | B60J 3/0226 |
| | | | 296/97.11 |
| 2011/0298251 A1* | 12/2011 | McLoughlin | A62B 25/00 |
| | | | 297/188.04 |
| 2012/0043789 A1* | 2/2012 | Lee | B60N 3/08 |
| | | | 297/188.06 |
| 2012/0217773 A1* | 8/2012 | Jue | A47C 4/44 |
| | | | 297/188.14 |
| 2016/0192780 A1* | 7/2016 | Sinclair | A47C 4/04 |
| | | | 297/183.5 |

* cited by examiner

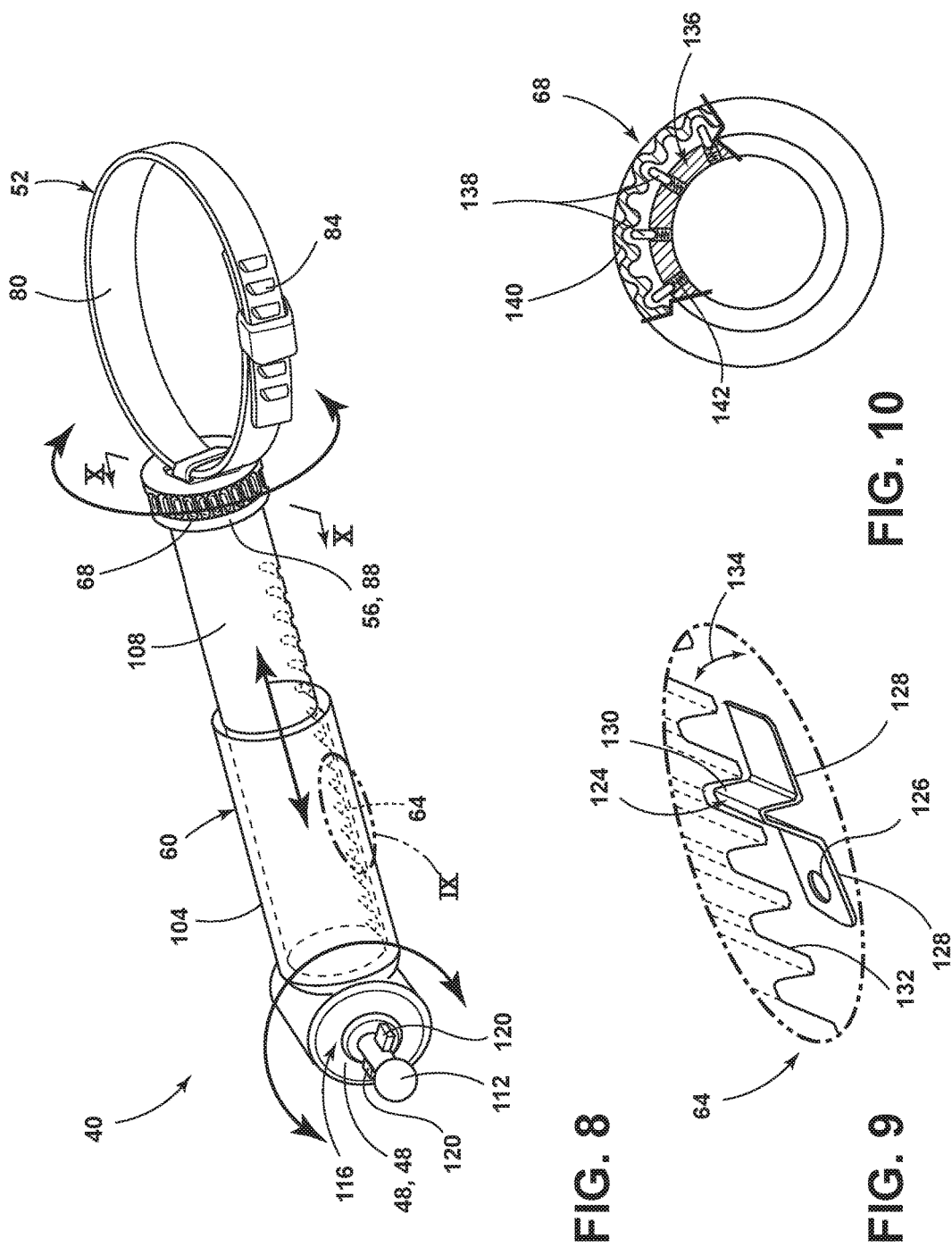

US 10,377,284 B2

HOLDER ASSEMBLY

FIELD OF THE DISCLOSURE

The present disclosure generally relates to a holder assembly. More specifically, the present disclosure relates to a holder assembly for a vehicle.

BACKGROUND OF THE INVENTION

Cup holders are typically designed into or integrally formed in a predetermined area or areas within a vehicle interior. However, the manufacturer-determined placement of the cup holders may not be ideal or preferable to a vehicle occupant. Therefore, alternative holder assemblies are desirable so as to enable a user to choose or otherwise customize the location of their holder assembly.

SUMMARY OF THE INVENTION

According to a first aspect of the present disclosure, a vehicle seating assembly includes a receiver positioned in the vehicle seating assembly and a cup holder assembly. The cup holder assembly includes a connector that is positioned at a first end of the cup holder assembly. The connector facilitates removable engagement with the receiver. An adjustable cup holder is positioned at a second end of the cup holder assembly. An arm is intermediately positioned between the first end and the second end of the cup holder assembly. The arm is equipped with lateral detents for telescoping movements and angular detents for rotating movements. An attachment elbow is pivotable relative to the seatback in a first plane through an angle of at least 180 degrees. The attachment elbow is additionally pivotable relative to the seatback in a second plane through an angle of at least 180 degrees. The first plane is substantially orthogonal to the second plane.

Embodiments of the first aspect of the present disclosure can include any one or a combination of the following features:
  the receiver and the connector engage in a quick-connect fashion that permits one-handed coupling between the receiver and the connector by a user;
  the attachment elbow is further pivotable in a third plane through an angle of at least 90 degrees, wherein the third plane is orthogonal to both the first plane and the second plane;
  the rotating and telescoping arm is capable of rotation through an angle between zero and 360 degrees;
  the adjustable cup holder further includes an adjustable band that has ratchet points that are used to adjust a diameter of the adjustable band; and
  the cup holder assembly can be locked in at least a stowed position, a fore position, and an aft position.

According to a second aspect of the present disclosure, a vehicle seating assembly includes a receiver positioned in a seatback. A holder assembly includes an arm having a first end and a second end. A connector is positioned at the first end of the arm. An adjustable cup holder is positioned at the second end of the arm. An attachment elbow is pivotable relative to the receiver.

Embodiments of the second aspect of the present disclosure can include any one or a combination of the following features:
  the arm is capable of telescoping movement and rotational movement;
  the telescoping movement of the arm is provided by lateral detents within the arm;
  the rotational movement of the arm is provided by angular detents; and
  the attachment elbow is pivotable relative to the seatback in a first plane and a second plane through an angle of at least 180 degrees.

According to a third aspect of the present disclosure, a holder assembly includes an arm having a first end and a second end. The arm is capable of telescoping and rotational movement. A connector is positioned at the first end. An accessory-engagement portion is positioned at the second end and configured to removably couple with an accessory.

Embodiments of the third aspect of the present disclosure can include any one or a combination of the following features:
  the accessory is an adjustable cup holder;
  the adjustable cup holder further includes an adjustable band that has ratchet points that are used to adjust a diameter of the adjustable band;
  the quick-connect connector operably couples with a quick-connect receiver on a vehicle;
  the telescoping movement of the arm is provided by lateral detents within the arm;
  the rotational movement of the arm is provided by angular detents;
  the hinge can be locked in at least a stowed position, a fore position, and an aft position;
  the holder assembly further includes an attachment elbow positioned between the arm and the quick-connect connector, wherein the attachment elbow is pivotable about a hinge; and
  the attachment elbow is pivotable about the hinge through an angle of at least 180 degrees.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 8 is a perspective view of a holder assembly;

FIG. 9 is an expanded view of section IX of FIG. 8; and

FIG. 10 is a cross-sectional view taken along line X-X of FIG. 8, illustrating angular detents.

DETAILED DESCRIPTION OF THE PREFERRED EMBODIMENTS

Figure 1:
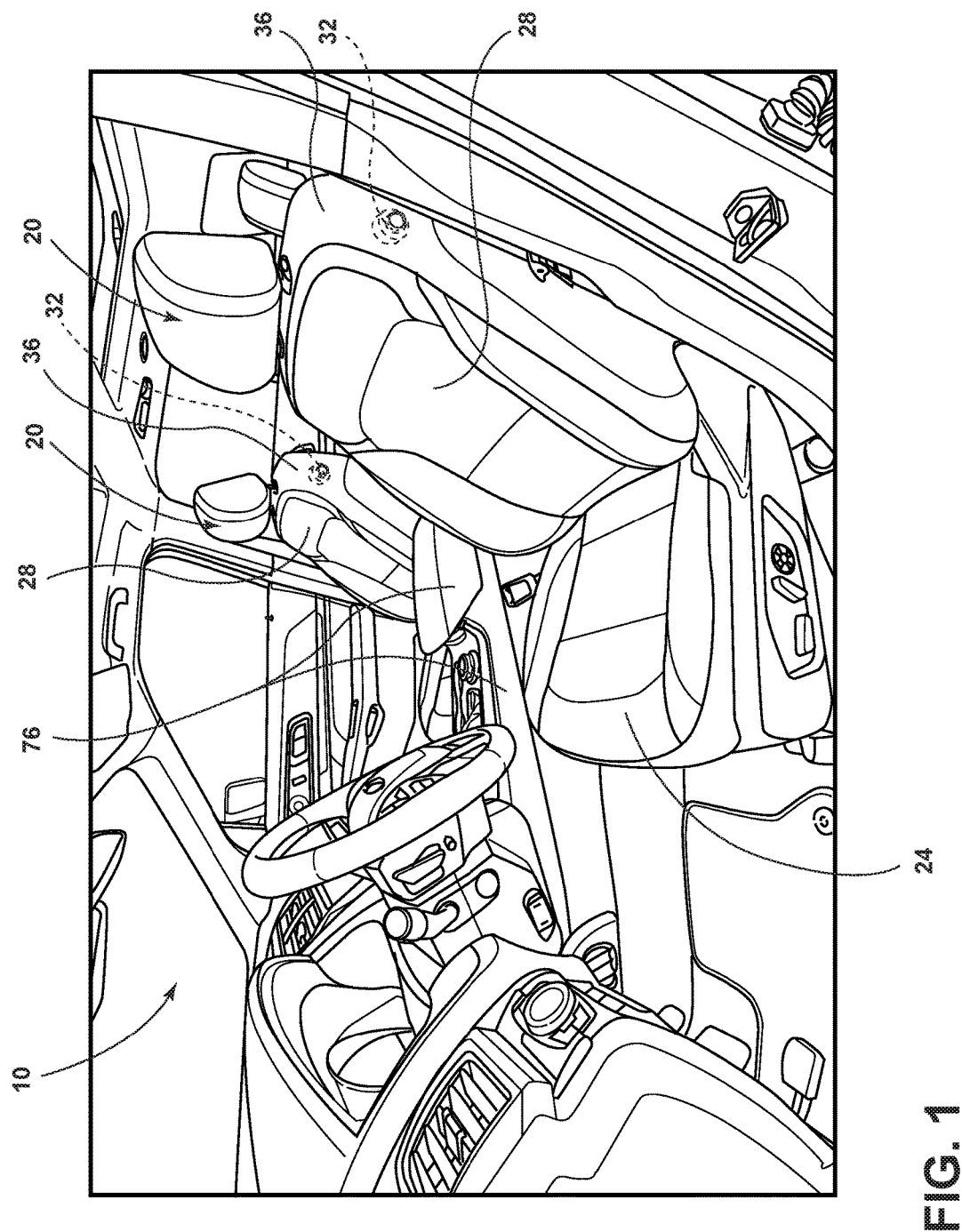
FIG. 1 is a side perspective view of an interior of a vehicle illustrating vehicle seating assemblies in a forward portion of the interior.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a holder assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-8, a vehicle seating assembly 20 includes a seat 24, a seatback 28, and a receiver 32 positioned in the vehicle seating assembly 20. The receiver 32 may be positioned in a side portion 36 of the seatback 28. A holder assembly 40 includes a connector 44 positioned at a first end 48 of holder assembly 40 for removable engagement with the receiver 32. The receiver 32 and the connector 44 may engage in a quick-connect fashion that permits one-handed coupling between the receiver 32 and the connector 44 by a user. An adjustable cup holder 52 is positioned at a second end 56 of the holder assembly 40. An arm 60 is intermediately positioned between the first end 48 and the second end 56 of the holder assembly 40. The arm 60 can be equipped with lateral detents 64 for telescoping movements and angular detents 68 for rotating movements. The lateral detents 64 can retain the desired position, as set by the user, through frictional engagement between a lateral detent protrusion and a lateral detent recess of the lateral detents 64. The angular detents 68 can retain the desired position, as set by the user, through frictional engagement between an angular detent protrusion and an angular detent recess of the angular detents 68. The holder assembly 40 can include an attachment elbow 72 that is pivotable relative to the seatback 28 in a first plane through an angle of at least 180 degrees and a second plane through an angle of at least 180 degrees. The first plane is substantially orthogonal to the second plane. The first plane can be an X-Z plane and the second plane can be a Y-Z plane.

Referring again to FIG. 1, the vehicle seating assembly 20 includes the seat 24 and the seatback 28. The seat 24 and the seatback 28 can be operably coupled in a manner that permits pivotable motion of the seatback 28 relative to the seat 24 such that the seatback 28 is able to recline. The vehicle seating assembly 20 can be located in a forward portion of a vehicle 10. More than one vehicle seating assembly 20 can be employed in the vehicle. The vehicle seating assemblies 20 located in the forward portion of the vehicle can be separated by a center console 76. The vehicle can be, for example, a motor vehicle.

Figure 2:
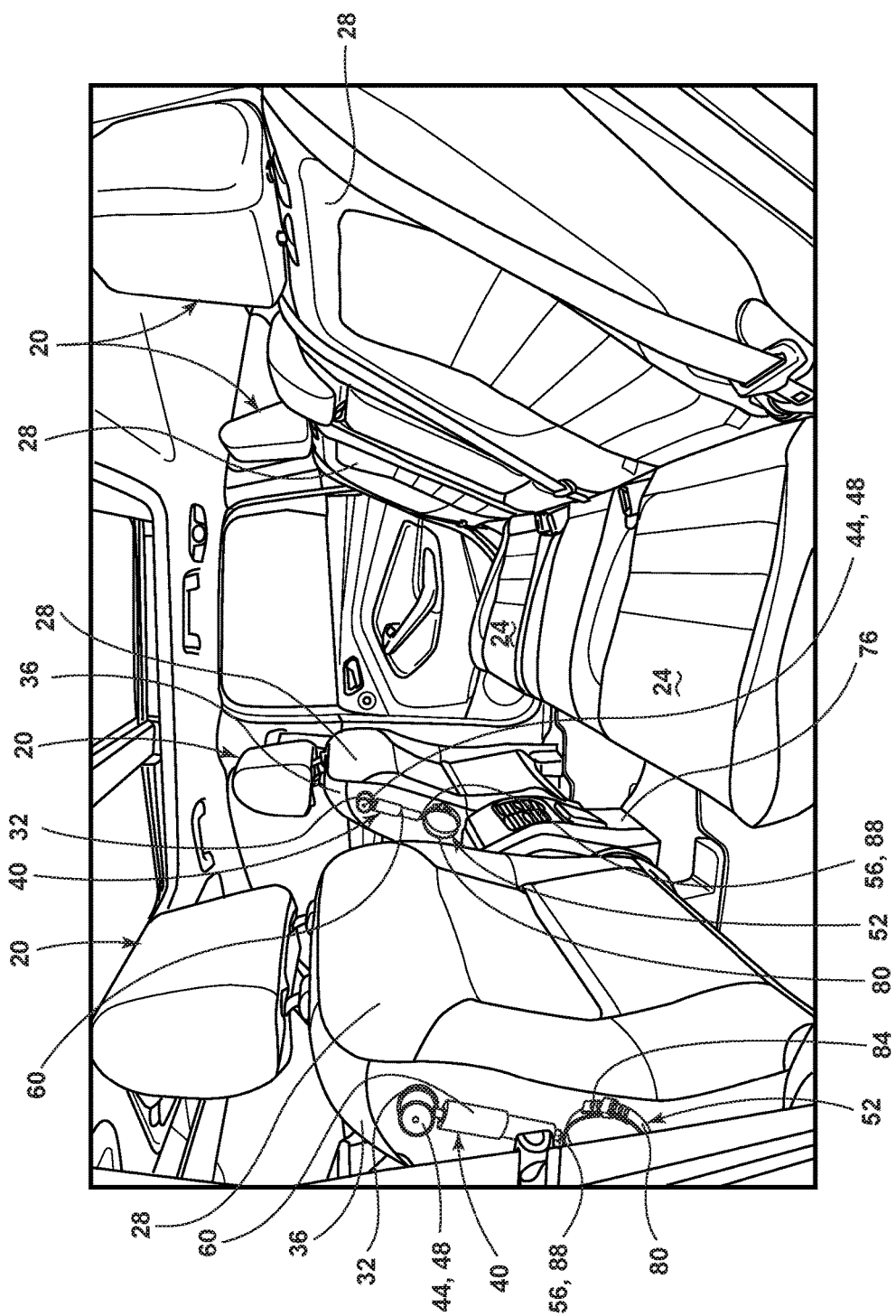
FIG. 2 is a side perspective view of an interior of a vehicle illustrating vehicle seating assemblies equipped with a holder assembly.

Referring now to FIG. 2, one or more vehicle seating assemblies 20 can additionally be located in a rearward portion of the vehicle. The holder assembly 40 can be removably coupled to the side portion 36 of the seatback 28. The holder assembly 40 can be removed from the side portion 36 of the seatback 28 and relocated to various positions within an interior of the vehicle or to an exterior of the vehicle. The various positions that the holder assembly 40 can be relocated to are equipped with the receiver 32. The various positions of the receivers 32 allow occupants of the vehicle to reposition the holder assembly 40 within the interior of the vehicle or the exterior of the vehicle to better provide for their preferences and desired uses. The holder assembly 40 can be positioned on the side portion 36 of the seatback 28 on at least one of an inboard and an outboard side of the vehicle seating assembly 20.

Figure 3:
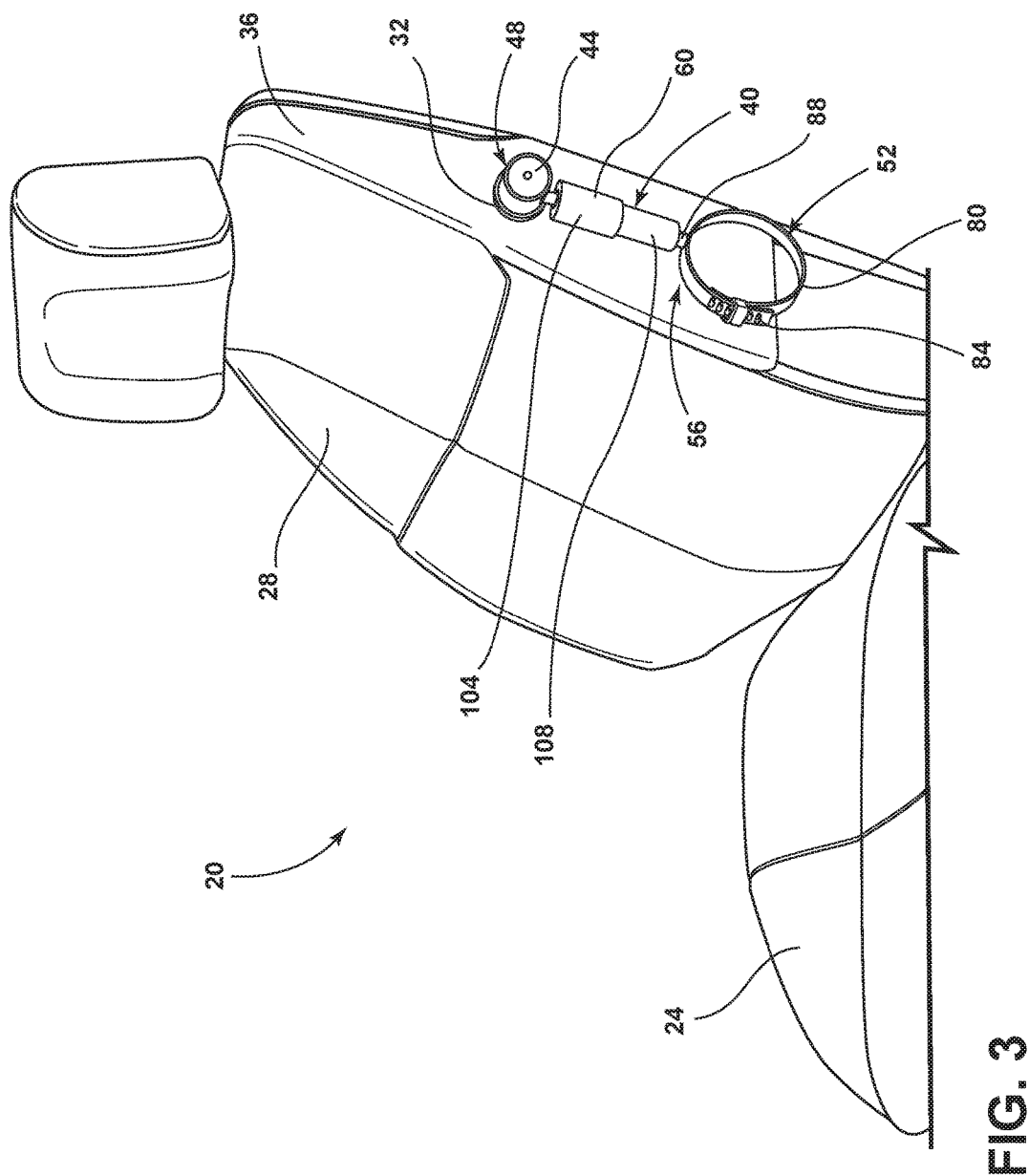
FIG. 3 is a side perspective view of a vehicle seating assembly equipped with a holder assembly.
Figure 4:
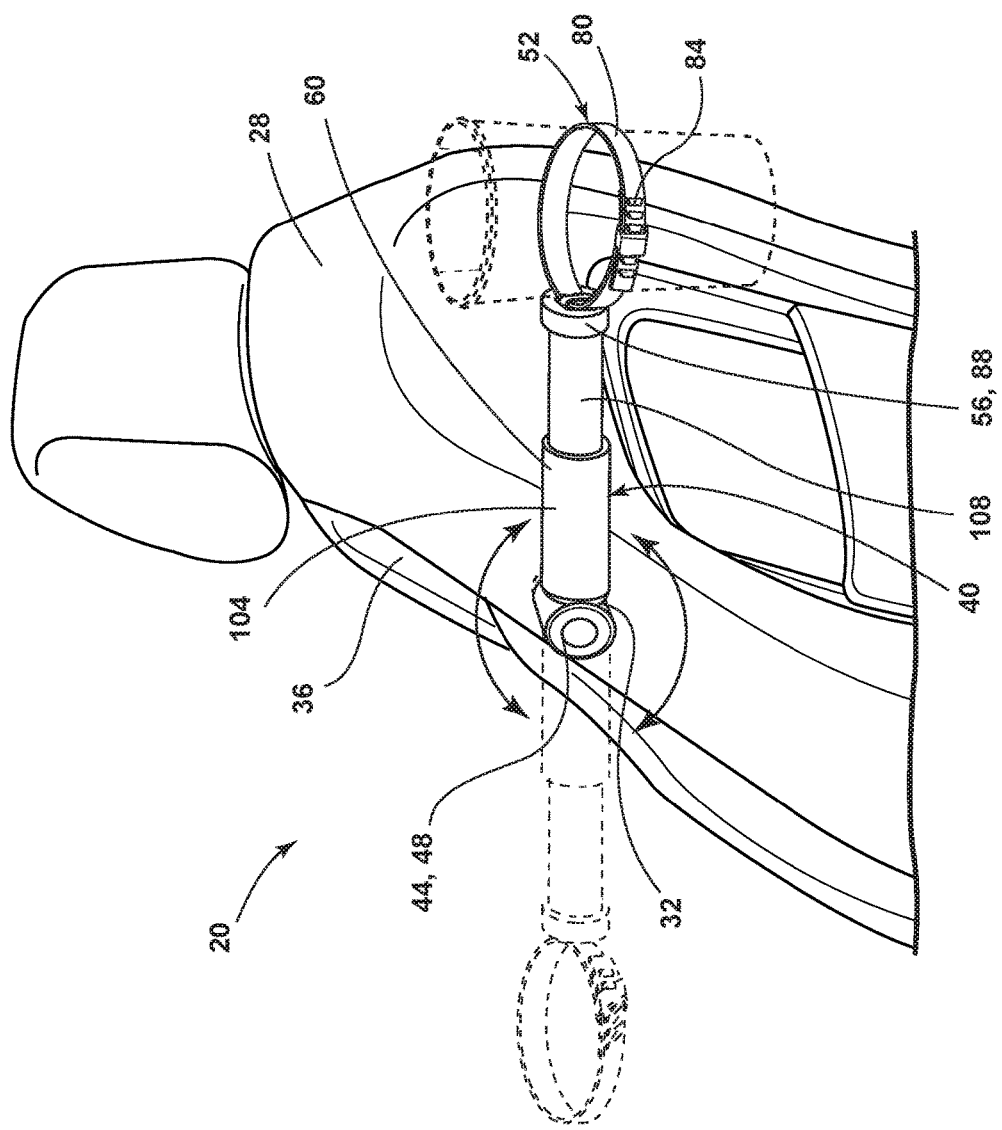
FIG. 4 is a rear perspective view of a vehicle seating assembly equipped with a holder assembly.

Referring to FIGS. 3 and 4, the holder assembly 40 is movable between at least a stowed position (FIG. 3), a fore position (FIG. 4, phantom line), and an aft position (FIG. 4, solid line). The holder assembly 40 can further be locked in at least the stowed position, the fore position, and the aft position. The adjustable cup holder 52 includes an adjustable band 80. The adjustable band 80 can include ratchet points 84 that are used to adjust a diameter of the adjustable band 80. While shown as discrete settings, it is contemplated that the ratchet points 84 can instead be a continuous distribution of adjustment points that allow a user to adjust the diameter of the adjustable cup holder 52 to correspond more closely to the vessel or beverage container that is intended to be held. The second end 56 of the holder assembly 40 can include an accessory-engagement portion 88 that is configured to removably couple with an accessory, such as the adjustable cup holder 52. Alternative accessories capable of engagement with the accessory-engagement portion 88 include, but are not limited to, waste bins, storage bins, hooks, latches, electronic device holders, and the like.

Figure 5:
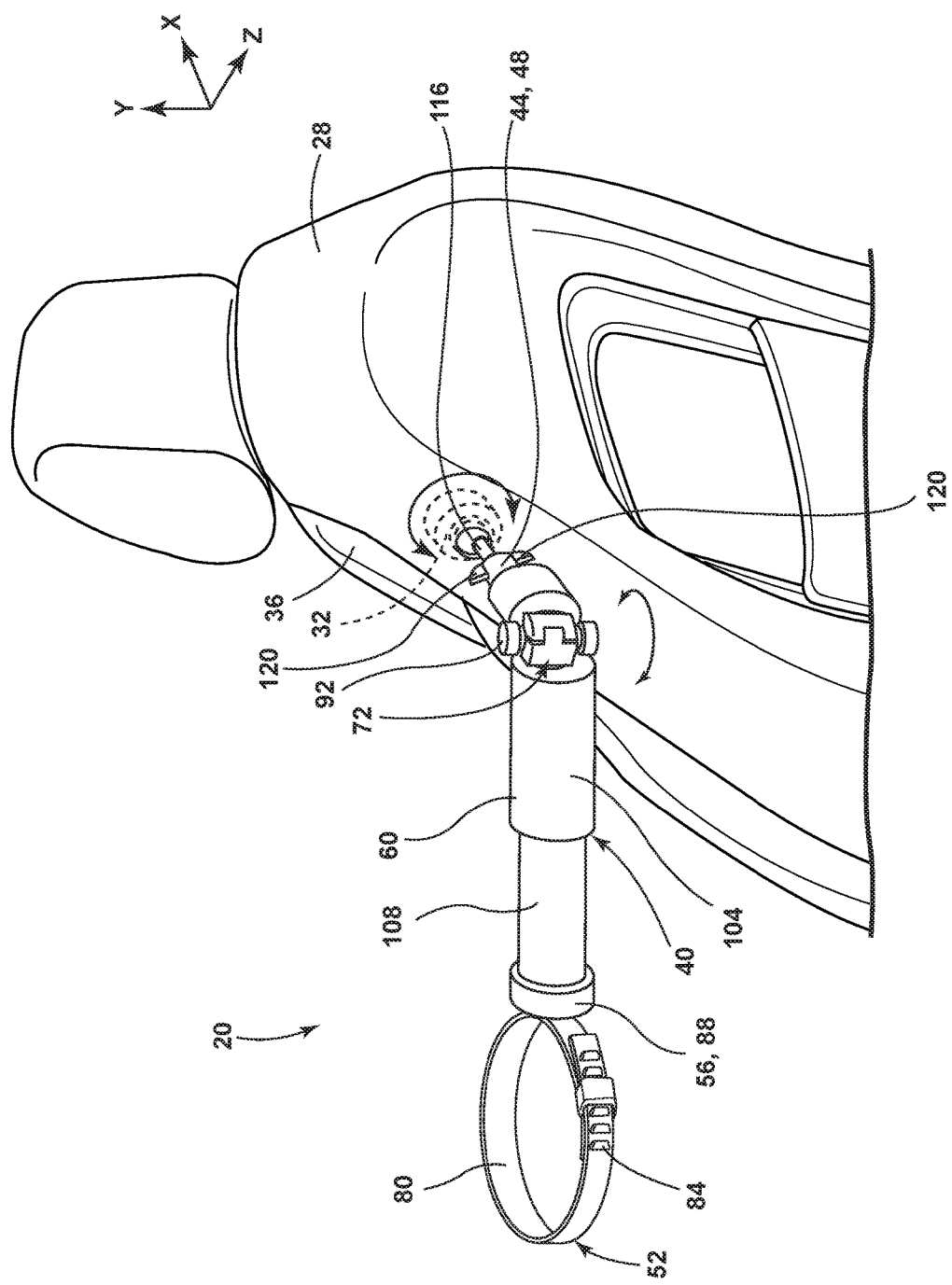
FIG. 5 is a rear perspective view of a vehicle seating assembly equipped with a holder assembly having an attachment elbow.

Referring now to FIG. 5, the holder assembly 40 can further include the attachment elbow 72. The attachment elbow 72 can include a hinge 92. The attachment elbow 72 is pivotable about the hinge 92 relative to the seatback 28 in a first plane and a second plane through an angle of at least 180 degree in both the first plane and the second plane. The first plane can be an X-Z plane, the second plane can be a Y-Z plane, and a third plane can be an X-Y plane. Movement in the first plane can be accomplished by providing a torque force to the holder assembly 40 at a position on the holder assembly 40 that is between the hinge 92 and the adjustable cup holder 52 while the holder assembly 40 is in the fore position or the aft position.

Movement in the second plane can be accomplished by providing a deployment force to the holder assembly 40 at a position on the holder assembly 40 that is between the hinge 92 and the adjustable cup holder 52 while the holder assembly 40 is in the stowed position. Movement in the third plane can be accomplished by providing a rotational force to the holder assembly 40 at a position on the holder assembly 40 that is between the hinge 92 and the adjustable cup holder 52 while the connector 44 is engaged with the receiver 32.

Referring again to FIG. 5, the holder assembly 40 includes the connector 44 positioned at the first end 48 of the holder assembly 40. The connector 44 operably couples with the receiver 32. The receiver 32 can be positioned at various locations on and/or in the vehicle. For example, the receiver 32 can be positioned in the side portion 36 of the seatback 28. The hinge 92 can be locked in at least the fore position (FIG. 5) and the aft position. The hinge 92 may additionally lock in a linear position that places the connector 44, the arm 60, and the attachment elbow 72 in line. That is, in embodiments that employ the attachment elbow 72, the holder assembly 40 can be locked in a linear position that places the connector 44, the arm 60, and the attachment elbow 72 along the same axis. The connector 44 of the holder assembly 40 can be configured to rapidly couple and decouple with the receiver 32, such that a user of the holder assembly 40 can quickly remove the holder assembly 40 from the receiver 32 and relocate the holder assembly 40 to another location on the vehicle that is equipped with the receiver 32. Alternatively, after removal of the holder assembly 40 from the receiver 32 the user can store the holder assembly 40 in a compartment of the vehicle.

Figure 6:
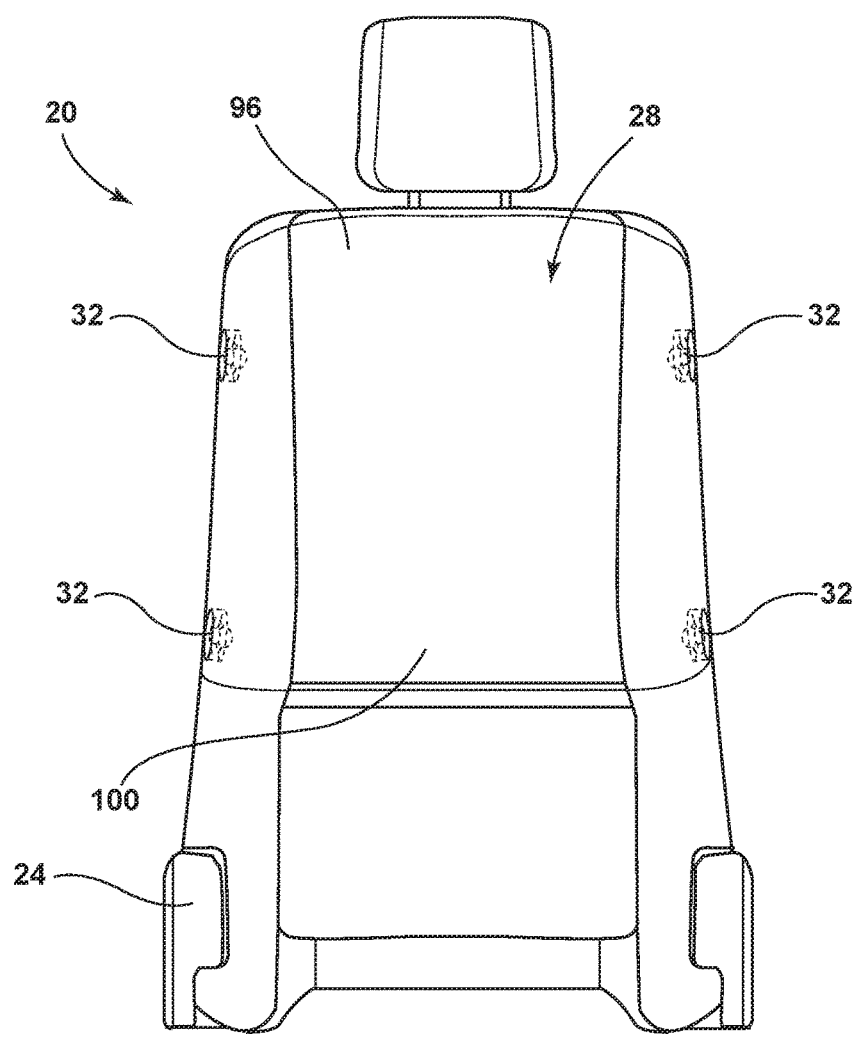
FIG. 6 is a rear view of a vehicle seating assembly equipped with at least one receiver.
Figure 7:
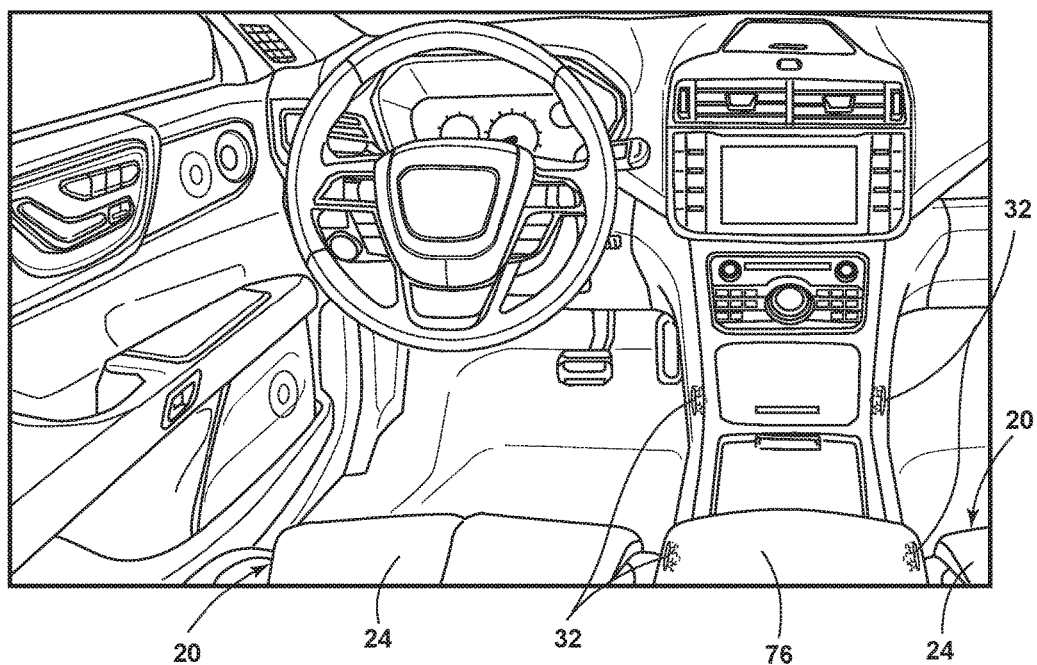
FIG. 7 is a perspective view of a center console equipped with at least one receiver.

Referring to FIGS. 6 and 7, receivers 32 can be positioned in various locations in the interior and on the exterior of the vehicle. For example, the receivers 32 can be positioned in an upper portion 96 of the seatback 28, a lower portion 100 of the seatback 28, in the center console 76, in a door of the vehicle, in the A-pillar, the B-pillar, and/or in an armrest of the vehicle seating assembly 20. The receivers 32 are configured to receive the connector 44 of the holder assembly 40 in a manner that permits rotation of the connector 44 within the receiver 32.

Referring now to FIG. 8, the connector 44 is positioned at the first end 48 of the holder assembly 40. The adjustable cup holder 52 is positioned at the second end 56 of the holder assembly 40. The arm 60 is intermediately positioned between the first end 48 and the second end 56 of the holder assembly 40. The arm 60 can include rotating and telescoping functionalities that allow the user of the holder assembly 40 to customize the length and positioning of the holder assembly 40 to their preferences and desired use. In embodiments that employ the attachment elbow 72 (FIG. 5), the attachment elbow 72 can be pivotable in the third plane through an angle of at least 90 degree. The third plane is orthogonal to both the first plane and the second plane. The rotating functionality of the arm 60 can be capable of rotation through an angle of between 0 and 360 degrees. The telescoping functionality of the arm 60 can be provided by the lateral detents 64. The rotational movement or functionality of the arm 60 can be provided by the angular detents 68.

Referring again to FIG. 8, the accessory-engagement portion 88 may be configured to removably engage the adjustable cup holder 52 and various other accessories. The ratchet points 84 on the adjustable band 80 of the adjustable cup holder 52 can be used to adjust a diameter of the adjustable band 80 such that various sizes of beverage containers or other generally cylindrical objects may be held within the adjustable cup holder 52. The arm 60 can include a first portion 104 and a second portion 108. The first portion 104 can have a larger inner diameter than an outer diameter of the second portion 108 such that the second portion 108 extendably engages with the first portion 104 to enable the telescoping movement of the arm 60. More specifically, the second portion 108 can be retracted into or extended out of the first portion 104 and be locked in a lateral position by the lateral detents 64. The connector 44 can include a sphere 112, a shaft 116, and retractable wings 120. The retractable wings 120 retain the holder assembly 40 within the receiver 32 upon engagement with the receiver 32. When the connector 44 is engaged with the receiver 32, the retractable wings 120 can be automatically retracted into the shaft 116 until the connector 44 is fully engaged with the receiver 32. Upon full engagement between the connector 44 and the receiver 32, the retractable wings 120 can extend radially outward to engage an inner surface of the receiver 32. When the connector 44 is fully engaged with the receiver 32, the retractable wings 120 retain the operable coupling of the connector 44 with the receiver 32 while permitting rotational movement of the connector 44 within the receiver 32. The retractable wings 120 can include an arcuate leading surface that is the first surface of the retractable wings 120 to engage with the receiver 32. In such an embodiment, the retractable wings 120 are retracted into the shaft 116 as the holder assembly 40 is engaged with the receiver 32. As the retractable wings 120 are further inserted into the receiver 32, the receiver 32 finishes traversing the arcuate leading surface and reaches a generally vertical surface. Once the generally vertical surface passes into the receiver 32, the retractable wings 120 can extend to engage with the inner surface of the receiver 32 and retain the holder assembly 40 in a coupling relationship with the receiver 32.

Referring again to FIG. 8, the retractable wings 120 can alternatively be generally rectangular in shape such that a first side and a second side are generally vertical and can be parallel to one another. In such an embodiment, a third side can be generally horizontal and extends between the first side and the second side. In embodiments where the retractable wings 120 are generally rectangular in shape, the receiver 32 can include a sloping surface that is presented as the initial engagement surface of the receiver 32. As the retractable wings 120 are inserted into the receiver 32, the sloping surface can begin the actuation of the retractable wings 120 to retract into the shaft 116. As the retractable wings 120 traverse the sloping surface, the second side passes into the receiver 32 and the retractable wings 120 can extend radially outward to engage the inner surface of the receiver 32 to retain the coupling relationship between the holder assembly 40 and the receiver 32.

Referring now to FIG. 9, the lateral detents 64 are illustrated in greater detail. The lateral detents 64 can operate with a spring clip 124 and lateral gear teeth 132. The spring clip 124 can include an attachment aperture 126 for securing the spring clip 124 to a support material, such as the arm 60. The spring clip 124 can further include a planar portion 128 and an engagement portion 130 that engages with lateral gear teeth 132. The spring clip 124 can be actuated in an up-and-down direction 134. The actuation of the spring clip 124 can be accomplished by operably coupling the portion of the spring clip 124 that has the attachment aperture 126 to the support material and allowing an end opposite the attachment aperture 126 to be free of fixed coupling with another portion of the holder assembly 40. The spring clip 124 can be operably coupled to the first portion 104 of the arm 60 (FIG. 8). For example, the spring clip 124 can be operably coupled to an interior surface of the first portion 104 of the arm 60 such that the spring clip 124 engages with the lateral gear teeth 132 as the second portion 108 of the arm 60 is extended and/or retracted relative to the first portion 104 of the arm 60. Alternatively, the spring clip 124 can be operably coupled to an end of the first portion 104 of the arm 60 that is proximal the second portion 108 of the arm 60 such that the spring clip 124 engages with the lateral gear teeth 132 as the second portion 108 of the arm 60 is extended and/or retracted relative to the first portion 104 of the arm 60. The engagement of the spring clip 124 with the lateral gear teeth 132 allows for "hard stops" or distinct pauses in the extension and/or retraction of the arm 60, which may prevent accidental or unintentional extension and/or retraction of the arm 60 when in use.

Referring to FIG. 10, the angular detents 68 can include a spring ring 136, pins 138, and angular gear teeth 140. The angular detents 68 can be aggressive in design. That is, the spring ring 136, pins 138, and angular gear teeth 140 can operably couple in a manner that may prevent accidental or unintentional rotation of the accessory-engagement portion 88 (FIG. 8) when in use. More specifically, a biasing force of the spring ring 136, a length of the pins 138, and a depth of the angular gear teeth 140 can be such that accidental or unintentional rotation of the accessory-engagement portion 88 may be prevented to a substantial degree, even while a container, such as a cup, is supported by the holder assembly 40 (FIG. 8). The biasing force of the spring ring 136 can be provided by a biasing member 142, such as a spring, a coil spring, a compression spring, or the like.

Cup holders are typically designed into or integrally formed in a predetermined area or areas within a vehicle interior. However, the manufacturer-determined placement of the cup holders may not be ideal or preferable to a vehicle occupant. Therefore, an alternative holder assembly 40 to those currently available is disclosed herein that allows the vehicle occupant to remove the holder assembly 40 from one area and utilize the holder assembly 40 in another area. The holder assembly 40 can be relocated to any area of the interior of the vehicle where the receivers 32 have been installed. Additionally, the holder assembly 40 can be relocated to any area on the exterior of the vehicle to be utilized by the consumer while doing work on the vehicle, tailgating, and the like. Further, the holder assembly 40 can be utilized in environments that are not on an exterior of the vehicle or inside an interior of the vehicle. In other words, the holder assembly 40 of the present disclosure can be utilized in a home, an office, a garage, etc. without departing from the concepts disclosed herein.

The holder assembly 40 of the present disclosure is capable of movement and/or adjustment in up to three planes, which allows a user to adjust the positioning of the holder assembly 40 to an optimal position and/or orientation to securely hold and retain an object. Additionally, the holder assembly 40 can be moved independently with respect to the seatback 28 or mounting surface that is equipped with the receiver 32. This is beneficial in that an occupant of the vehicle seating assembly 20 can adjust the vehicle seating assembly 20 to their personal comfort preferences and the user of the holder assembly 40 can retain an object in the holder assembly 40 without the risk of spilling the contents of the object retained.

The holder assembly 40 of the present disclosure provides the added benefit of interchangeable accessories that can be operably coupled to the holder assembly 40 via the accessory-engagement portion 88. The interchangeable accessories include, but are not limited to, waste bins, storage bins, hooks, latches, electronic device holders, and the like. More than one holder assembly 40 may be used at a time. The number of holder assemblies 40 employed at any given time can be limited by the number of receivers 32 available and/or installed. Therefore, the vehicle may be equipped with a number of receivers 32 that are at least equal to the seating capacity of the vehicle. For example, the vehicle may be equipped with two receivers 32, three receivers 32, four receivers 32, five receivers 32, six receivers 32, seven receivers 32, eight receivers 32, nine receivers 32, and so on.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly comprising:
   a receiver positioned in said vehicle seating assembly;
   a cup holder assembly comprising:
   a connector positioned at a first end of the cup holder assembly for removable engagement with the receiver;
   an adjustable cup holder positioned at a second end of the cup holder assembly;
   a rotating and telescoping arm intermediately positioned between the first end and the second end of the cup holder assembly, wherein the rotating and telescoping arm is equipped with lateral detents that provide discrete positions for telescoping movements and angular detents that provide discrete positions for rotating movements; and
   an attachment elbow that is pivotable relative to the seatback in a first plane through an angle of at least 180 degrees and a second plane through an angle of at least 180 degrees, wherein the first plane is substantially orthogonal to the second plane.

2. The vehicle seating assembly of claim 1, wherein the receiver and the connector engage in a quick-connect fashion that permits one-handed coupling between the receiver and the connector by a user.

3. The vehicle seating assembly of claim 1, wherein the attachment elbow is further pivotable in a third plane through an angle of at least 90 degrees, and wherein the third plane is orthogonal to both the first plane and the second plane.

4. The vehicle seating assembly of claim 1, wherein the rotating and telescoping arm is capable of rotation through an angle between zero and 360 degrees.

5. The vehicle seating assembly of claim 1, wherein the adjustable cup holder further comprises:
   an adjustable band having ratchet points that are used to adjust a diameter of the adjustable band.

6. The vehicle seating assembly of claim 1, wherein the cup holder assembly can be locked in at least a stowed position, a fore position, and an aft position.

7. A vehicle seating assembly comprising:
   a receiver positioned in a seatback; and
   a cup holder assembly comprising:
   an arm having a first end and a second end, wherein the arm is capable of telescoping movement, and wherein lateral detents within the arm provide discrete positions of the telescoping movement;
   a connector positioned at the first end of the arm;
   an adjustable cup holder positioned at the second end of the arm; and
   an attachment elbow that is pivotable relative to the receiver.

8. The vehicle seating assembly of claim 7, wherein the arm is capable of rotational movement.

9. The vehicle seating assembly of claim 7, wherein the connector comprises one or more retractable wings that are extendably coupled to a shaft of the connector, and wherein the retractable wings retain the connector to the receiver.

10. The vehicle seating assembly of claim 8, wherein discrete positions of the rotational movement of the arm are provided by angular detents.

11. The vehicle seating assembly of claim 7, wherein the attachment elbow is pivotable relative to the seatback in a first plane and a second plane through an angle of at least 180 degrees for each of the first and second planes.

12. A holder assembly comprising:
   an arm having a first end and a second end, wherein the arm is capable of telescoping and rotational movement, and wherein angular detents provide discrete positions for the rotational movement;
   a quick-connect connector positioned at the first end; and
   an accessory-engagement portion positioned at the second end and configured to removably couple with an accessory.

13. The holder assembly of claim 12, wherein the accessory is an adjustable cup holder.

14. The holder assembly of claim 12, wherein the adjustable cup holder further comprises:
   an adjustable band having ratchet points that are used to adjust a diameter of the adjustable band.

15. The holder assembly of claim 12, wherein the quick-connect connector operably couples with a quick-connect receiver on a vehicle.

16. The holder assembly of claim 12, wherein lateral detents within the arm provide discrete positions of the telescoping movement of the arm.

17. The holder assembly of claim 12, wherein the connector comprises one or more retractable wings that are extendably coupled to a shaft of the connector, and wherein the retractable wings retain the connector to the receiver.

18. The holder assembly of claim 12, wherein the hinge can be locked in at least a stowed position, a fore position, and an aft position.

19. The holder assembly of claim 12, further comprising:
   an attachment elbow positioned between the arm and the quick-connect connector, wherein the attachment elbow is pivotable about a hinge.

20. The holder assembly of claim 19, wherein the attachment elbow is pivotable about the hinge through an angle of at least 180 degrees.

* * * * *